United States Patent
Guay et al.

(10) Patent No.: US 9,325,619 B2
(45) Date of Patent: Apr. 26, 2016

(54) SYSTEM AND METHOD FOR USING VIRTUAL LANES TO ALLEVIATE CONGESTION IN A FAT-TREE TOPOLOGY

(71) Applicant: Oracle International Corporation, Redwood Shores, CA (US)

(72) Inventors: Wei Lin Guay, Penang (MY); Bartosz Bogdanski, Oslo (NO)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 125 days.

(21) Appl. No.: 13/671,467

(22) Filed: Nov. 7, 2012

(65) Prior Publication Data

US 2013/0121149 A1   May 16, 2013

Related U.S. Application Data

(60) Provisional application No. 61/560,175, filed on Nov. 15, 2011.

(51) Int. Cl.
*H04L 12/801* (2013.01)
*H04L 12/753* (2013.01)
*H04L 12/703* (2013.01)

(52) U.S. Cl.
CPC .............. *H04L 47/12* (2013.01); *H04L 45/48* (2013.01); *H04L 45/28* (2013.01)

(58) Field of Classification Search
CPC ... H04L 12/462; H04L 41/0659; H04L 45/00; H04L 69/40; H04L 47/12; H04L 45/48; H04L 45/28
USPC ........................... 370/254–350; 709/201–213
See application file for complete search history.

(56) References Cited

U.S. PATENT DOCUMENTS

| | | | |
|---|---|---|---|
| 7,016,971 B1* | 3/2006 | Recio et al. ................... | 709/233 |
| 7,016,996 B1 | 3/2006 | Schober | |
| 7,136,907 B1 | 11/2006 | Nordstrom et al. | |
| 7,466,701 B2* | 12/2008 | Mondinelli et al. .......... | 370/389 |
| 7,636,772 B1 | 12/2009 | Kirby et al. | |
| 7,644,182 B2 | 1/2010 | Banerjee et al. | |
| 7,876,752 B1* | 1/2011 | Rimmer et al. ............... | 370/389 |
| 8,949,389 B1* | 2/2015 | Rimmer ........................ | 709/222 |
| 2003/0005039 A1 | 1/2003 | Craddock et al. | |
| 2003/0156588 A1 | 8/2003 | Elbourne et al. | |
| 2004/0062266 A1* | 4/2004 | Rojas et al. ................... | 370/447 |
| 2009/0187756 A1 | 7/2009 | Nollet et al. | |
| 2009/0307642 A1 | 12/2009 | Lai et al. | |

(Continued)

OTHER PUBLICATIONS

Guay, W. et al., "dFtree—A Fat-Tree Routing Algorithm Using Dynamic Allocation of Virtual Lanes to Alleviate Congestion in InfiniBand Networks," NDM '11 Proceedings of the First International Workshop on Network-Aware Data Management, Nov. 14, 2011, Seattle, Washington, USA, pp. 1-10.

(Continued)

*Primary Examiner* — Ayaz Sheikh
*Assistant Examiner* — Debebe Asefa
(74) *Attorney, Agent, or Firm* — Tucker Ellis LLP

(57) ABSTRACT

A system and method can alleviate congestion in a middleware machine environment with a plurality of switches in a fat-tree topology. The middleware machine environment can support a plurality of end nodes and allows for generating a virtual lane assignment for every pair of source end node and destination end node. Then, the packet flows from a source end node to different destination end nodes sharing a physical link can be distributed across different virtual lanes in order to avoid the head-of-line (HOL) blocking.

20 Claims, 4 Drawing Sheets

(56) References Cited

U.S. PATENT DOCUMENTS

| | | |
|---|---|---|
| 2010/0077312 A1 | 3/2010 | Morss |
| 2011/0044435 A1 | 2/2011 | Bachran et al. |
| 2012/0072563 A1 | 3/2012 | Johnsen et al. |
| 2012/0311333 A1 | 12/2012 | Johnsen et al. |

OTHER PUBLICATIONS

Guay, W. et al., Host Side Dynamic Reconfiguration with InfiniBand, 2010 IEEE International Conference on Cluster Computing, IEEE, Piscataway, NJ, USA, Sep. 20, 2010, pp. 126-135.

Guay, W. et al., "vFtree—A Fat-Tree Routing Algorithm Using Virtual Lanes to Alleviate Congestion," 2011 IEEE International Parallel & Distributed Processing Symposium, May 16, 2011, pp. 197-208.

Vishnu, A. et al., "Topology Agnostic Hot-Spot Avoidance With InfiniBand," Concurrency and Computation: Practice and Experience, Mar. 10, 2009, pp. 301-319, vol. 21, No. 3, published online Sep. 1, 2008 in Wiley InterScience (www.interscience.wiley.com).

European Patent Office, International Searching Authority, International Search Report and Written Opinion dated Mar. 27, 2013 for International Application No. PCT/US2012/065115, 12 pages.

* cited by examiner

SYSTEM AND METHOD FOR USING VIRTUAL LANES TO ALLEVIATE CONGESTION IN A FAT-TREE TOPOLOGY

CLAIM OF PRIORITY

This application claims the benefit of priority on U.S. Provisional Patent Application No. 61/560,175, entitled "SYSTEM AND METHOD FOR USING VIRTUAL LANES TO ALLEVIATE CONGESTION IN A FAT-TREE TOPOLOGY" filed Nov. 15, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCED APPLICATIONS

The current application hereby incorporates by reference the material in the following patent application:

U.S. patent application Ser. No. 13/648,961, filed Nov. 7, 2012, entitled "SYSTEM AND METHOD FOR USING DYNAMIC ALLOCATION OF VIRTUAL LANES TO ALLEVIATE CONGESTION IN A FAT-TREE TOPOLOGY,", which is now U.S. Pat. No. 8,879,396, issued on Nov. 4, 2014.

FIELD OF INVENTION

The present invention is generally related to computer systems, and is particularly related to preventing head-of-line blocking and traffic congestion in a middleware machine environment.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein is a system and method that can alleviate congestion in a middleware machine environment with a plurality of switches in a fat-tree topology. The middleware machine environment can support a plurality of end nodes and allows for generating a virtual lane assignment for every pair of source end node and destination end node. Then, the packet flows from a source end node to different destination end nodes sharing a physical link can be distributed across different virtual lanes in order to avoid the head-of-line (HOL) blocking.

DETAILED DESCRIPTION

Figure 1:
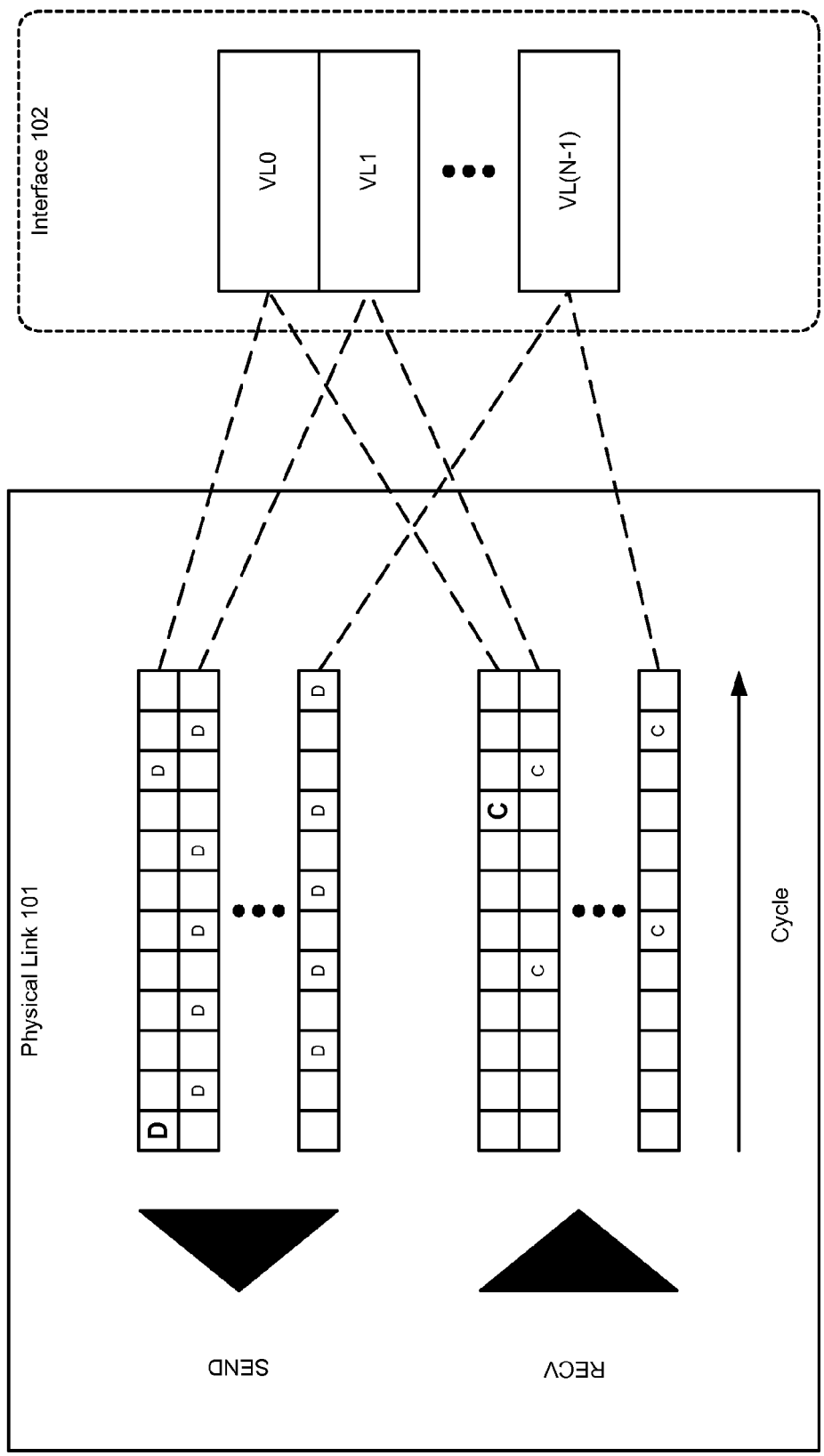
FIG. 1 shows an illustration of using virtual lanes in a middleware machine environment, in accordance with an embodiment of the invention.

Algorithmic predictability of network traffic patterns is reduced with the introduction of virtualization and many-cores systems. When multiple virtualized clients reside on the same physical hardware, the network traffic becomes an overlay of multiple traffic patterns that might lead to hot-spots in the network. A hot-spot occurs if multiple flows are destined toward a single endpoint. Common sources for hot-spots include complex traffic patterns due to virtualization, migration of virtual machine images, checkpoint and restore mechanisms for fault tolerance, and storage and I/O traffic.

When a hot-spot exists in a network, the flows designated for the hot-spot might reduce the performance for other flows, called victim flows, not designated to the hot-spot. This is due to the head-of-line (HOL) blocking phenomena created by the congested hot-spot.

One way to avoid this problem is to use a congestion control (CC) mechanism such as the CC mechanism evaluated in hardware. However, the congestion control mechanism implemented in hardware may not always be available, e.g. due to a mixture of old and new equipments coexisting in large clusters. Furthermore, the selection of the appropriate CC parameters highly depends on the topology and incorrect parameters might lead to performance degradation. Additionally, some oscillations can occur among the flows due to the fact that the congestion control mechanism is dynamically adjusting the injection rate of the senders.

In accordance with an embodiment of the invention, a system and method can alleviate congestion in a middleware machine environment with a plurality of switches in a fat-tree topology. By distributing source-destination flows across virtual lanes, the packet flows from the contributor end node to different destinations sharing a physical link can be isolated and not be affected by HOL blocking.

InfiniBand (IB) Network and Virtual Lanes (VLs)

In accordance with an embodiment of the invention, congestion can be alleviated in the InfiniBand (IB) architecture. The IB architecture is a serial point-to-point technology, and each of the IB networks, or subnets, can include a set of hosts interconnected using switches and point-to-point links. A single subnet is scalable to more than ten-thousand nodes and two or more subnets can be interconnected using an IB router.

The hosts and switches within a subnet are addressed using local identifiers (LIDs), e.g. a single subnet is limited to 49151 unicast addresses. IB is a lossless networking technology, where flow-control can be performed per virtual lane (VL).

An IB subnet can employ at least one subnet manager (SM) which is responsible for initializing and starting up the subnet including the configuration of all the IB ports residing on switches, routers and host channel adapters (HCAs) in the subnet. The SMs can be responsible for routing table calculations. Routing tables can be calculated at network initialization time and this process can be repeated whenever the topology changes in order to update the routing tables and ensure optimal performance.

At the time of initialization, the SM starts in a discovering phase where the SM does a sweep of the network in order to discover all switches and hosts. During the discovering phase, the SM may also discover any other SMs present and negotiate who should be the master SM. When the discovering phase is completed, the SM can enter a master phase. In the master phase, the SM proceeds with LID assignment, switch configuration, routing table calculations and deployment, and port configuration. At this point, the subnet is up and ready to use.

After the subnet is configured, the SM can monitor the network for changes (e.g. a link goes down, a device is added, or a link is removed). If a change is detected during the monitoring process, a message (trap) can be forwarded to the SM and the SM can reconfigure the network. Part of the reconfiguration process, or a heavy sweep process, is the rerouting of the network which can be performed in order to guarantee full connectivity between all source and destination pairs.

FIG. 1 shows an illustration of using virtual lanes in a middleware machine environment, in accordance with an embodiment of the invention. As shown in FIG. 1, a physical link 101 can be associated with an interface 102. The interface 102 can include multiple VLs, e.g. VL0, VL1, and VL(N−1), each of which can be supported on top of the physical link 101. VLs are logical channels on the same physical link with separate buffering, flow-control, and congestion management resources. There can be up to sixteen virtual lanes with a minimum of two VLs that can be supported: i.e. VL 0 as the default data lane and VL 15 as the subnet management traffic lane.

FIG. 1 shows an illustration of per VL credit-based flow-control, where VL0 runs out of credits after cycle 1 (despicted by a bold D) and is to transmit until credit arrives in cycle 9 (despicted by a Bold C). As the other lanes have sufficient credit, they are unaffected and are able to use the slot that VL0 would otherwise use. Transmission for VL0 resumes when credit arrives.

The VL architecture in IB consists of four mechanisms: service levels, virtual lanes, virtual lane weighting, and virtual lane priorities. A service level (SL) is a 4-bit field in the packet header that denotes what type of service a packet shall receive as it travels toward its destination. By default, in IB architecture, sixteen SLs can be mapped to the corresponding VL by the SL number, i.e. a SL can be mapped to a particular VL. If a direct SL to VL mapping is not possible, the SL can be degraded according to a SL to VL mapping table. In the worst case only one data VL is supported and all SLs are mapped to VL0.

Each VL can be configured with a weight and a priority, where the weight is the proportion of link bandwidth a given VL is allowed to use and the priority is either high or low. In accordance with an embodiment of the invention, a direct SL to VL mapping with equal priority for all VLs can be used to support alleviating congestion in an IB network without a need of using the weight and priority features.

Congestion Avoidance Mechanism Using Virtual Lanes

In accordance with an embodiment of the invention, a routing-based congestion avoidance mechanism can be applied to high-performance network technologies supporting VLs. A routing algorithm can use the available VLs to resolve the hot-spot problem by distributing source destination pairs across all available VLs.

Figure 2:
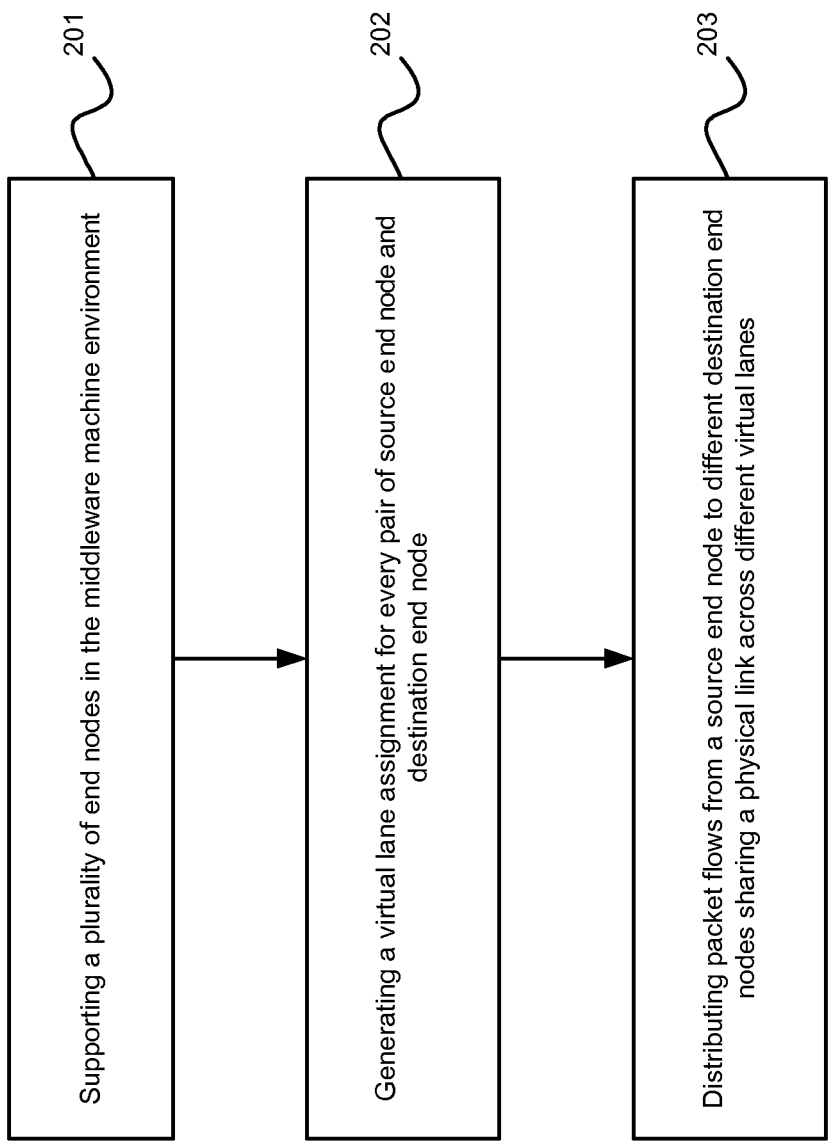
FIG. 2 illustrates an exemplary flow chart for alleviating congestion in a middleware machine environment, in accordance with an embodiment of the invention.

FIG. 2 illustrates an exemplary flow chart for alleviating congestion in a middleware machine environment, in accordance with an embodiment of the invention. As shown in FIG. 2, at step 201, the middleware machine environment can support a plurality of end nodes. Then, at step 202, the middleware machine environment allows for generating a virtual lane assignment for every pair of source end node and destination end node, e.g. after the routing phase is completed. Furthermore, at step 203, the packet flows from a source end node to different destination end nodes sharing a physical link can be distributed across different virtual lanes.

A table lookup algorithm can be used for routing in IB, where each switch holds a forwarding table containing a linear list of LIDs (destination addresses) and the corresponding output ports. This routing algorithm can be an extension of the fat-tree routing algorithm that is available in OpenSM. The algorithm can isolate the possible endpoint congestion flows by distributing source-destination pairs across virtual lanes.

The approach as shown in FIG. 2 can be applied to any topology, in order to exploit the available network resources. In the following sections, the routing algorithm is applied on the fat-trees to showcase the routing-based congestion avoidance mechanism.

Alleviate Congestion in a Fat-tree Topology

In accordance with an embodiment of the invention, the fat-tree topology is a layered network topology with link capacity equal at every tier (applies for balanced fat-trees), and is commonly implemented by building a tree with multiple roots, often following the m-port n-tree definition or the k-ary n-tree definition. The fat-tree topology has regular structure that makes it straightforward to distribute the destinations across VLs and the fat-tree topology does not require VLs to be routed deadlock-free. With the introduction of IB, the fat-tree became the topology of choice for HPC clusters, due to deadlock freedom, fault tolerance, and full bisection bandwidth properties.

When multiple virtualized clients reside on the same physical hardware, the network traffic becomes an overlay of multiple traffic patterns that might lead to hot-spots in the network. Virtual lanes can be used to alleviate network congestion in the fat-tree topology. The concept of virtual lanes makes it possible to build virtual networks on top of a physical topology. These virtual networks, or layers, can be used for various purposes such as efficient routing, deadlock avoidance, fault-tolerance and service differentiation.

Figure 3:
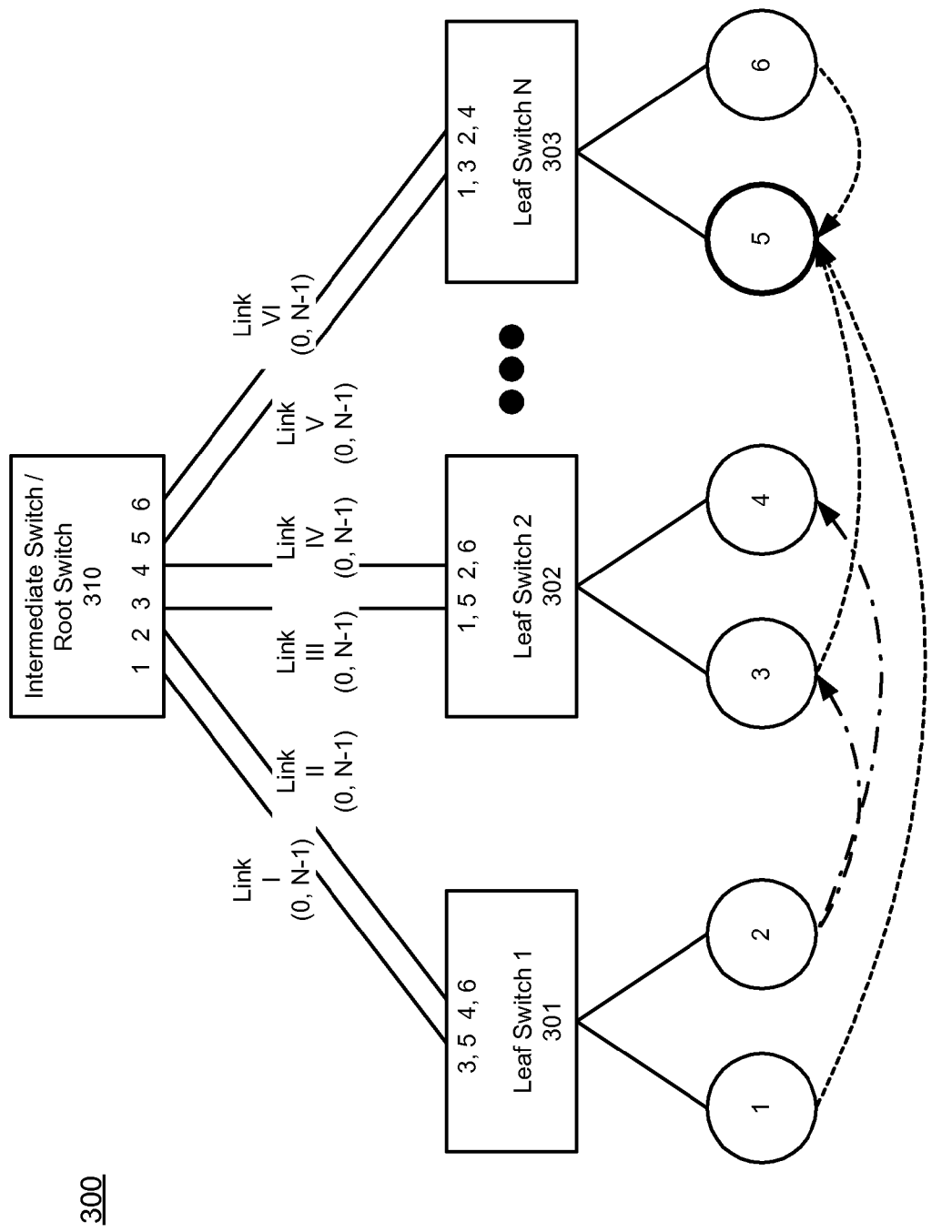
FIG. 3 shows an illustration of a communication pattern in a fat-tree topology that creates hot-spot, in accordance with an embodiment of the invention.

FIG. 3 shows an illustration of a communication pattern that creates a hot-spot in a fat-tree topology in accordance with an embodiment of the invention. As shown in FIG. 3, the middleware machine environment 300 includes a plurality of leaf switches 301 to 303, and a plurality of nodes, such as server nodes 1-6 that connect to the leaf switches in a fat-tree topology. Additionally, the leaf switches 301-303 can connect to an intermediate switch or a root switch 310 using one or more physical links I-VI. Each of these physical links can support one or more virtual lanes that support separate buffering, flow control, and congestion management resources.

A routing algorithm can ensure deadlock freedom in the fat tree topology as shown in FIG. 3. The routing algorithm can include two stages: an upward stage in which the packet is forwarded from the source and a downward stage when the packet is forward toward the destination. The transition between these two stages occurs at the least common ancestor, which is the intermediate switch or a root switch 310 that can reach both the source and the destination through its downward ports.

The algorithm ensures deadlock-freedom, and its IB implementation ensures that every path toward the same destination converges at the same root node, which causes all packets toward that destination to follow a single dedicated path in the downward direction. By having dedicated downward paths for every destination, contention in the downward stage is effectively removed, so that packets for different destinations have to contend for output ports in only half of the switches on their paths. In oversubscribed fat-trees, the downward path is not dedicated and is shared by several destinations. By carefully designing an oversubscribed fabric, the implementation costs of an HPC cluster can be significantly reduced with only a limited loss in the overall application performance.

The system can exploit VLs for improved routing and network performance. Since the fat-tree routing algorithm only requires a single VL, the remaining virtual lanes are available for other purposes such as quality of service or for reducing the negative impact of congestion induced by the head-of-line blocking as we will do in this paper.

The fat-tree routing algorithm can be optimized to avoid the contention for shift all-to-all communication traffic patterns. In a fully populated and non-oversubscribed fat-tree, this algorithm can equalize the load on each port and always selects a different upwards link for destinations located on the same leaf switch. As shown in FIG. 3, destination node 3 can be reached from leaf switch 1 using link I, while destination node 4 is reached using link II. The destinations sharing the same upstream link are always located on different leaf switches.

Also as shown in FIG. 3, end node 5 can become a hot-spot, when multiple flows (in dotted lines) from the contributors such as node 1, node 3, and node 6 are directed toward it. Such flows designated to the hot-spot can reduce the performance for other flows. For example, the flow from node 2 to node 3 can become a victim flow (in dashed line), due to the head-of-line (HOL) blocking phenomena.

In the above example, the upward stage of the flow from node 1 to node 5 and the flow from node 2 to node 3 shares the physical link I, since physical link I is designated to handle the traffic from the leaf switch 1 to the nodes 3 and 5. The physical link I can have multiple virtual lanes. The system can distribute the two upward stages of the two flows over different virtual lanes on the same physical link I. For example, the flow from node 1 to node 5 can go through virtual lane 0 on physical link I, while the flow from node 2 to node 3 can go through virtual lane 1 on physical link I. Hence, the head-of-line blocking can be prevented even when node 5 becomes a hot-spot, because the flow from node 2 to node 3 uses a different virtual lane with separate buffering resources.

In accordance with an embodiment of the invention, the number of virtual lanes depends on the number of destinations that can share the same upstream physical link. In one example, the number of virtual lanes can be configured to be equal to the number of leaf switches. The number of virtual lanes can cover all the traffic routed to different destinations connected to the other leaf switches, except the leaf switch connecting to the traffic source node. In other examples, the number of virtual lanes can be defined in a network specification, such as the IB specification, or be configured to accommodate for other purposes such as Quality of Service (QoS). The specification may require that the VL used from A to B is symmetric, which means that the communication from A to B and from B to A must be able to use the same VL.

Figure 4:
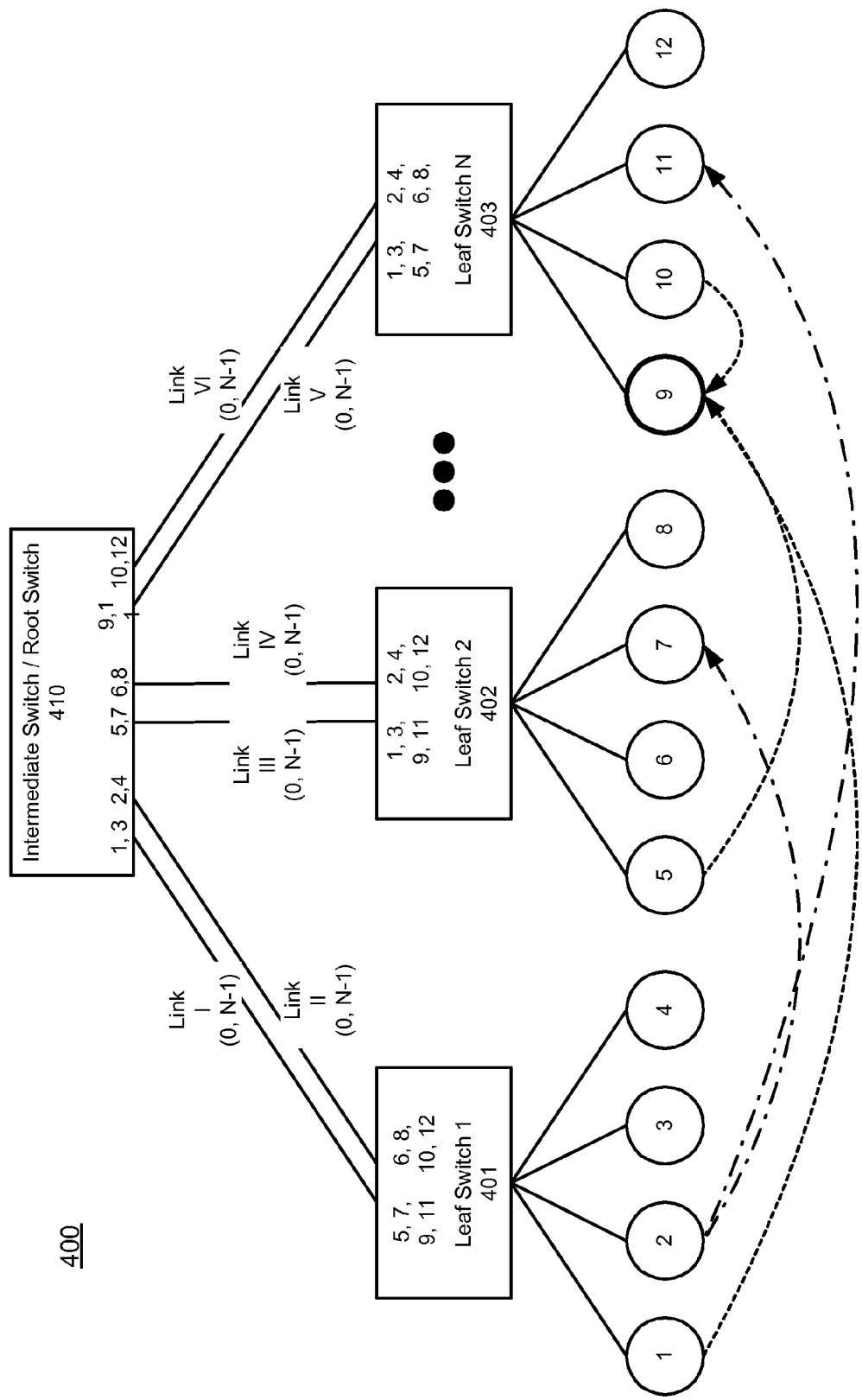
FIG. 4 shows an illustration of a communication pattern in an oversubscribed fat-tree topology that creates a hot-spot, in accordance with an embodiment of the invention.

FIG. 4 shows an illustration of a communication pattern that creates a hot-spot in an over-subscribed fat-tree topology in accordance with an embodiment of the invention. As shown in FIG. 4, the middleware machine environment 400 includes a plurality of leaf switches, such as switches 401 to 403, and a plurality of nodes, such as server nodes 1-12 that connect to the leaf switches in a fat-tree topology. Additionally, the leaf switches 401-403 can connect to an intermediate switch or a root switch 410 using one or more physical links I-IV.

In this oversubscribed fat-tree, the downward path for forwarding a packet is shared by several destinations, instead of dedicating to a single destination as shown in FIG. 3. The oversubscribed fat-tree in FIG. 4 is a 2:1 oversubscribed fat-tree, since each downward path is shared by two destinations.

As shown in FIG. 4, the traffic flows from nodes 1, 5, and 10 to node 9 can cause the negative impact of HOL blocking in the oversubscribed fat-tree. Thus, the hot-spot is at node 9, and node 1, 5 and 10 are the contributors.

There can be two situations where the victim flows can suffer from HOL blocking when the links are oversubscribed, one at the upward stage and one at the downward stage.

As shown in FIG. 4, the victim flow from node 2 to node 9 includes an upward stage from leaf switch 401 to the intermediate/root switch 410. This is similar to the example as shown in FIG. 3, where the performance reduction is due to the upstream link being shared with the congestion contributor, node 1.

Also as shown in FIG. 4, the victim flow from node 2 to node 11 includes a downward stage from the intermediate/root switch 410 to the leaf switch 403. In this case, the performance reduction happens at the downstream link being shared with the congestion contributor, node 1, even though the destination node of the victim flow, node 11, is a different node from the hot-spot.

The system can distribute the flows over different virtual lanes on the same physical link. In an oversubscribed fat-tree, utilizing more virtual lanes may not increase performance for certain types of traffic pattern. For example, with separate VL for each congestion contributor, the parking lot problem is resolved but the share of the link bandwidth given to the victim flow is reduced. Thus, the congestion avoidance mechanism can be supported only for preventing the performance reduction due to the upstream link being shared with the congestion contributors.

vFtree Routing

In accordance with an embodiment of the invention, a routing algorithm, such as a vFtree algorithm, can be used on top of a fat-tree routing algorithm and distributes all destinations sharing the same upstream link across different virtual lanes. Thus, if one of the designated destinations is the contributor to an end point hot-spot, the other destination flow (victim flow) sharing the same upstream port is not affected by HOL blocking because the victim flow uses a different virtual lane with its own buffering resources.

The vFtree routing algorithm can be implemented using two algorithms as presented in Algorithm 1 and Algorithm 2 below.

Algorithm 1 Assign Virtual Lanes

Require: Routing table has been generated.
Ensure: Symmetrical VL for every <src, dst> pair.
```
 1: for sw_src = 0 to max_leaf_switches do
 2:     if odd(sw_src * 2/max_vl) then
 3:         vl = ((sw_src * 2) % max_vl) + 1
 4:     else
 5:         vl = (sw_src * 2) % max_vl
 6:     end if
 7:     for sw_dst = 0 to max_leaf_switches do
 8:         if sw_dst > sw_src then
 9:             if VL[sw_src][sw_dst].set = FALSE then
10:                 VL[sw_src][sw_dst].vl = vl
11:                 VL[sw_src][sw_dst].set = TRUE
12:             end if
13:             if VL[sw_dst][sw_src].set = FALSE then
14:                 VL[sw_dst][sw_src].vl = vl
15:                 VL[sw_dst][sw_src].set = TRUE
16:             end if
17:             vl = incr(vl) % max_vl
18:         else if sw_dst = = sw_src then
19:             VL[sw_dst][sw_src].vl = 0
20:             VL[sw_dst][sw_src].set = TRUE
21.         end if
30.     end for
35: end for
```

Algorithm 2 Get Virtual Lanes ($LID_{src}$, $LID_{dst}$)

```
1: dst_id = get_leaf_switch_id(LID_dst)
2: src_id = get_leaf_switch_id(LID_src)
5: return VL [src_id][dst_id]
```

As shown in the above, Algorithm 1 can distribute different pairs of source leaf switch and destination leaf switch across the available virtual lanes. The outer for loop in Algorithm 1 iterates through all the source leaf switches and the inner for loop iterates through all the destination leaf switches. In the inner for loop, Algorithm 1 checks whether a VL has been assigned to a pair of source leaf switch and destination leaf switch. If not, the algorithm assigns a VL accordingly. The requirement is that the VL assigned to a pair of source leaf switch and destination leaf switch is the same as the VL assigned to a pair of destination leaf switch and source leaf switch. The if . . . else block starting at line 2 determines the initial VL value used for the inner for loop so the overlapping of VLs is minimized. Here, a maximum VL variable can be set as an input argument, e.g. for OpenSM, that provides flexibility to the cluster administrator who may wish to reserve some VLs for quality of service (QoS).

When a connection (Queue Pair) is established in IB, the source node can query the path record and then Algorithm 2 can be executed. The arguments passed to this function are the source and destination addresses. Using these values, the source node obtains the VL from the array generated in Algorithm I to be used for communication with the destination node.

Unlike the conventional fat-tree routing, the vFtree algorithm allows an application to query a communication manager (CM) in order to acquire the correct SL in a topology, since the CM can return the SL set up by the SM and this SL implies which VL should be used. Otherwise, the default VL, VL0, can be used.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for alleviating congestion in a middleware machine environment, comprising:
    providing a fat-tree topology in a middleware machine environment, wherein the fat-tree topology includes a source leaf switch associated with a plurality of source end nodes, a plurality of destination leaf switches, each associated with one or more destination end nodes, and a central connecting switch that connects the source leaf switch and the destination leaf switches using a plurality of physical links, wherein each physical link includes a plurality of virtual lanes;
    assigning the plurality of virtual lanes in a particular physical link that connects the source leaf switch and the central connecting switch and is shared by the plurality of destination leaf switches, to different pairs of leaf switches, wherein each of the different pairs of leaf switches represents the source leaf switch and one of the plurality of destination leaf switches;
    generating an array that contains one or more virtual lanes assigned for each pair of leaf switches;
    identifying a plurality of packet flows, wherein each packet flows is transmitted between a different source end node and a destination end node associated with a different destination leaf switch; and
    distributing the plurality of packet flows across the plurality of virtual lanes in the particular physical link, by performing the steps comprising
        receiving a request to transmit data, from a source end node at the source leaf switch to a destination end node at a destination leaf switch,
        determining, based on the pairing of the source leaf switch and the destination leaf switch, a particular virtual lane within the particular physical link, for use in transmitting the data, and
        obtain the particular virtual lane from the array to transmit the data.

2. The method according to claim 1, wherein each of the plurality of source and destination leaf switches includes a forwarding table containing a list of destination addresses and one or more corresponding ports.

3. The method according to claim 1, wherein the plurality of virtual lanes in the particular physical link that equals to the number of destination leaf switches.

4. The method according to claim 1, wherein the plurality of virtual lanes in the particular physical link that equals to the number of destination leaf switches minus one.

5. The method according to claim 1, wherein at least one of the destination end nodes that receive the plurality of packet flows contributes to a hot-spot.

6. The method according to claim 1, wherein the central connecting switch is an intermediate switch or a root switch in the fat-tree topology.

7. The method according to claim 1, wherein the obtaining of the particular virtual lane from the array includes invoking a funciton that takes the addresses of the source left switch and the destination leaf switch.

8. The method according to claim 1, wherein the obtaining of the particular virtual lane from the array includes querying a communication manager to acqiure a service level in the fat-tree topology, wherein the acquired service level indicates which virtual lane is to be used.

9. A non-transitory machine readable storage medium having instructions stored thereon that when executed cause one or more microprocessors to perform the steps comprising:
configuring a fat-tree topology in a middleware machine environment, wherein the fat-tree topology includes a source leaf switch associated with a plurality of source end nodes, a plurality of destination leaf switches, each associated with one or more destination end nodes, and a central connecting switch that connects the source leaf switch and the destination leaf switches using a plurality of physical links, wherein each physical link includes a plurality of virtual lanes;
assigning the plurality of virtual lanes in a particular physical link that connects the source leaf switch and the central connecting switch and is shared by the plurality of destination leaf switches, to different pairs of leaf switches, wherein each of the different pairs of leaf switches represents the source leaf switch and one of the plurality of destination leaf switches;
generating an array that contains one or more virtual lanes assigned for each pair of leaf switches;
identifying a plurality of packet flows, wherein each packet flows is transmitted between a different source end node and a destination end node associated with a different destination leaf switch; and
distributing the plurality of packet flows across the plurality of virtual lanes in the particular physical link, by performing the steps comprising
receiving a request to transmit data, from a source end node at the source leaf switch to a destination end node at a destination leaf switch,
determining, based on the pairing of the source leaf switch and the destination leaf switch, a particular virtual lane within the particular physical link, for use in transmitting the data, and
obtain the particular virtual lane from the array to transmit the data.

10. The non-transitory machine readable medium according to claim 9, wherein the plurality of virtual lanes in the particular physical link that equals to the number of destination leaf switches.

11. The non-transitory machine readable medium according to claim 9, wherein the plurality of virtual lanes in the particular physical link that equals to the number of destination leaf switches minus one.

12. The non-transitory machine readable medium according to claim 9, wherein at least one of the destination end nodes that receive the plurality of packet flows contributes to a hot-spot.

13. The non-transitory machine readable medium according to claim 9, wherein the central connecting switch is an intermediate switch or a root switch in the fat-tree topology.

14. The non-transitory machine readable medium according to claim 9, wherein the obtaining of the particular virtual lane from the array includes invoking a funciton that takes the addresses of the source left switch and the destination leaf switch.

15. The non-transitory machine readable medium according to claim 9, wherein the obtaining of the particular virtual lane from the array includes querying a communication manager to acqiure a service level in the fat-tree topology, wherein the acquired service level indicates which virtual lane is to be used.

16. A system for alleviating congestion in a middleware machine environment, comprising:
a computer one or more microprocessors;
a fat-tree topology in a middleware machine environment executing on the computer, wherein the fat-tree topology includes a source leaf switch associated with a plurality of source end nodes, a plurality of destination leaf switches, each associated with one or more destination end nodes, and a central connecting switch that connects the source leaf switch and each destination leaf switch using a plurality of physical links;
wherein the system operates to perform the steps of
assigning the plurality of virtual lanes in a particular physical link that connects the source leaf switch and the central connecting switch and is shared by the plurality of destination leaf switches, to different pairs of leaf switches, wherein each of the different pairs of leaf switches represents the source leaf switch and one of the plurality of destination leaf switches;
identifying a plurality of packet flows, wherein each packet flows is transmitted between a different source end node and a destination end node associated with a different destination leaf switch; and
distributing the plurality of packet flows across the plurality of virtual lanes in the particular physical link, by performing the steps comprising
receiving, at a source end node, a request to transmit data, from a source end node at the source leaf switch to a destination end node at a destination leaf switch,
determining, based on the pairing of the source leaf switch and the destination leaf switch, a particular virtual lane within the particular physical link, for use in transmitting the data, and
obtain the particular virtual lane from the array to transmit the data.

17. The system according to claim 16, wherein the plurality of virtual lanes in the particular physical link that equals to the number of destination leaf switches.

18. The system according to claim 16, wherein the plurality of virtual lanes in the particular physical link that equals to the number of destination leaf switches minus one.

19. The system according to claim 16, wherein at least one of the destination end nodes that receive the plurality of packet flows contributes to a hot-spot.

20. The system according to claim 16, wherein the central connecting switch is an intermediate switch or a root switch in the fat-tree topology.

\* \* \* \* \*